United States Patent [19]

Yoshiga

[11] Patent Number: 4,484,725
[45] Date of Patent: Nov. 27, 1984

[54] BIMETAL DRIVEN CONTROL VALVE

[75] Inventor: Kenji Yoshiga, Funabashi, Japan

[73] Assignee: Fuji Koki Manufacturing Co., Ltd., Tokyo, Japan

[21] Appl. No.: 308,598

[22] Filed: Oct. 5, 1981

[30] Foreign Application Priority Data

Feb. 18, 1981 [JP] Japan .............................. 56-21691[U]

[51] Int. Cl.³ ............................................. F16K 31/04
[52] U.S. Cl. .................................... 251/11; 236/68 B; 60/529
[58] Field of Search .................... 251/11; 60/529, 528; 236/101 B, 92 B, 68 B

[56] References Cited

U.S. PATENT DOCUMENTS

| 1,259,371 | 3/1918 | Davis | 251/11 |
| 3,107,532 | 10/1963 | Lingnau | 60/529 |
| 3,397,552 | 8/1968 | Harnish | |
| 3,478,534 | 11/1969 | Matthies | |
| 3,967,781 | 7/1976 | Kunz | |

FOREIGN PATENT DOCUMENTS

| 228980 | 8/1963 | Austria | 251/11 |
| 55-6025 | 1/1980 | Japan | |
| 56-3359 | 1/1981 | Japan | |

OTHER PUBLICATIONS

Ashrae Journal, Thermal-Electric Expansion Valve, Jan. 1968.
Catalog of Singer Co., Ltd. Pub., Jul. 1980.

Primary Examiner—A. Rosenthal

[57] ABSTRACT

A bimetal driven control valve comprises: a main body having an inflow channel, an outflow channel, and an orifice which connects the inflow channel and the outflow channel; a first bimetal which constitutes part of a tubular body, an outer portion of the bimetal being fixed to the main body; a second bimetal which constitutes part of the tubular body and whose outer circumferential surface is formed by the same metal used for the inner circumferential surface of the first bimetal, and whose inner circumferential surface is formed by the same metal used for the outer circumferential surface of the first bimetal, the inner circumferential surface of the second bimetal being opposed to the inner circumferential surface of the first bimetal: hinges for connecting respective ends of the first and second bimetals to form the tubular body; a value member which is mounted in the main body and which is connected to an outer portion of the second bimetal for moving the valve member between a first position at which the orifice is closed by its other end and a second position at which the orifice is released to be open in correspondence with the radial movement of the second bimetal; and heating wire for heating the first bimetal.

2 Claims, 10 Drawing Figures

PRIOR ART

FIG. 10
PRIOR ART

BIMETAL DRIVEN CONTROL VALVE

BACKGROUND OF THE INVENTION

The present invention relates to a bimetal driven control valve in which bimetal deformation controls a flow rate.

Bimetal driven control valves are described in U.S. Pat. Nos. 3,397,552, 3,478,534 and 3,967,781. In the control valves described in the above patents, the bimetals are deformed by changes in ambient temperature so that precise control in places where changes in the ambient temperature are great cannot be performed.

Japanese Laid-Open patent application No. 55-6025 describes a bimetal driven control valve which eliminates the influence of changes in the ambient temperature. FIG. 1 of this application is a vertical cross-sectional view of a bimetal driven valve device and FIG. 2 is a plan view of the bimetal plate used in the device of FIG. 1, to which reference is herein made. In this control valve which is shown in vertical cross-section in FIG. 9 of the accompanying drawings, respective ends of a pair of bimetals 2 and 3 are mounted on the inner surface of a housing 1. The pair of bimetals 2 and 3 are disposed substantially parallel to each other. Respective metals ( ᵞ ), of low thermal expansion coefficient, oppose each other. The pair of bimetals 2 and 3 are interconnected by a rigid body 5 to which both ends of the bimetals are connected. When the ambient temperature rises, one bimetal 2 tends to bend upward in a convex shape, while the other bimetal 3 tends to bend downward in a convex shape. As a result, according to the inventor of this application, the stress generated at the bimetal 2 is balanced by the stress generated at the bimetal 3 so that the position of a valve rod 17 does not change.

Figure 9:
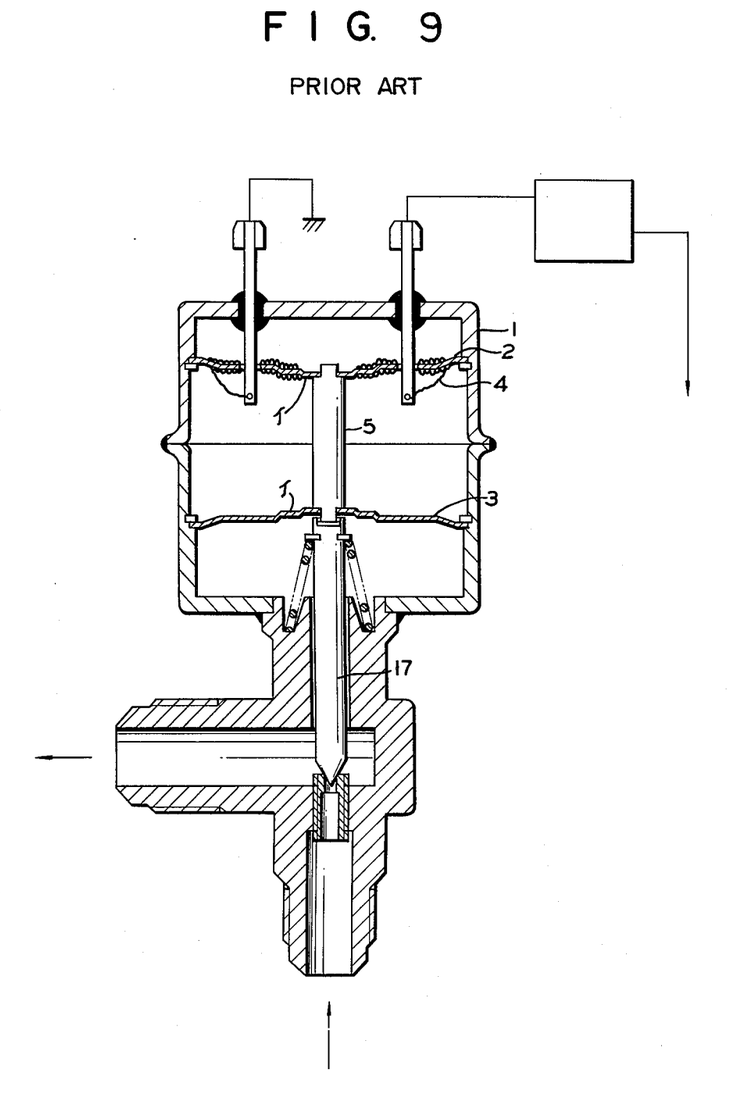
FIG. 9 is a vertical cross-sectional view of a bimetal driven valve device of the prior art.

In practice, however, when the ambient temperature rises, the position of the valve rod 17 changes.

This is because of the fact that when the ambient temperature rises, the stress distributions respectively generated at the bimetals 2 and 3 prevent the formation of a smooth arc extending upward in a convex shape at the bimetal 2 and a smooth arc extending downward in a convex shape at the bimetal 3. The pair of bimetals 2 and 3 are respectively deformed in a sinusoidal shape due to the stress, since the bimetals 2 and 3 are interconnected by the housing 1 and the rigid body 5. When the pair of bimetals 2 and 3 deform in this way, the position of the valve rod 17 changes. In this embodiment, obviously the bimetal 2 cannot be bent to form a smooth arc extending upward even when it is heated by the heating means 4. Thus, a precise control of flow rate cannot be achieved by the vertical movement of the valve rod 17.

In this control valve, the respective ends of the pair of bimetals 2 and 3 are mounted on the inner surface of the housing 1, and the pair of bimetals 2 and 3 must be interconnected by the rigid body 5. With this construction, the assembly process of the control valve is complicated, and the manufacturing cost of the control valve increased.

In FIG. 3 of Japanese Laid-Open patent application No. 56-3859 which is a vertical cross-sectional view of a pilot valve and to which reference is herein made, an improvement in the control valve of Japanese Laid-Open patent application No. 55-6,025 described above is described. In this improved control valve which is shown in vertical cross-section in FIG. 10 of the accompanying drawings, the respective ends of a pair of bimetals 31 and 32 are not mounted to the inner surface of a housing 30. The pair of bimetals 31 and 32 are interconnected by a pair of rigid bodies 33 and 34. In the pair of bimetals 31 and 32 which are spaced apart and substantially parallel to each other, a metal ( ᵞ ) of high thermal expansion coefficient of the bimetal 31 opposes a metal (☐) of low thermal expansion coefficient of the bimetal 32. When the ambient temperature rises, the bimetal 31 tends to bend downward in a convex shape, while the bimetal 32 tends to bend downward in a convex shape. The displacement of the bimetal 31 is equal to that of the bimetal 32, so the position of a valve body 36 does not change.

Figure 10:
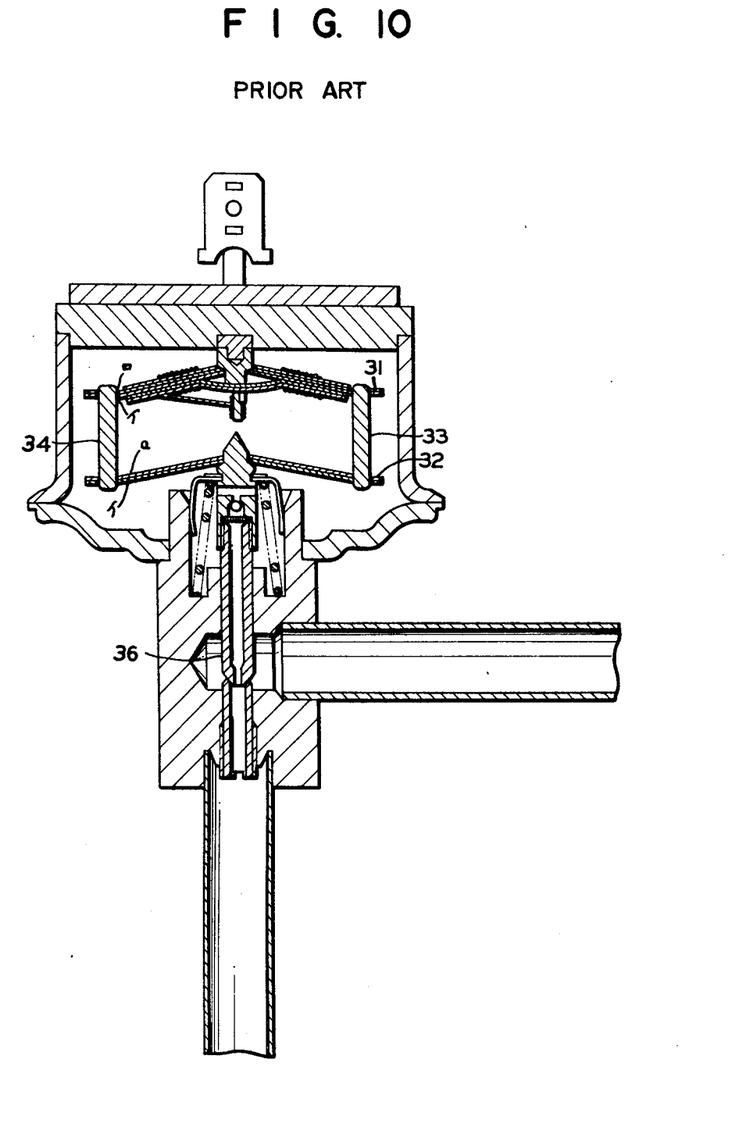
FIG. 10 is a vertical cross-sectional view of a pilot valve of the prior art showing an improvement of the device shown in FIG. 9.

In order to balance the displacement of the bimetal 31 with that of the bimetal 32, the pair of bimetals 31 and 32 must be disposed substantially parallel to each other. However, with this construction, in a unit constituted by the pair of bimetals 31 and 32 which are held substantially parallel to each other by a pair of the rigid bodies 33 and 34, the parallel arrangement of the pair of bimetals 31 and 32 may be destroyed when an external force is imposed on the control valve before or during assembly. Therefore, after assembly of the control valve, an operation for reforming the parallel arrangement of the bimetals is often required. This reforming operation complicates the assembly process of the control valve. Due to the external force imposed on the bimetals, the pair of bimetals 31 and 32 which are disposed substantially parallel to each other may show metal fatigue at a considerably earlier period of time. The parallel arrangement of the pair of bimetals 31 and 32 is disturbed in a comparatively earlier period of application of the control valve. As a result, in a comparatively shorter period of time, changes in the flow rate in accordance with changes in the external temperature tend to occur and precise flow rate control is not achieved.

SUMMARY OF THE INVENTION

The object of the present invention is to provide a bimetal driven control valve in which precise flow rate control can be performed for a long period of time regardless of the ambient temperature, and in which the manufacturing process is simple.

An embodiment of the present invention and various modifications thereof will now be described with reference to the accompanying drawings.

DETAILED DESCRIPTION OF THE PREFERRED EMBODIMENTS

Figure 1:
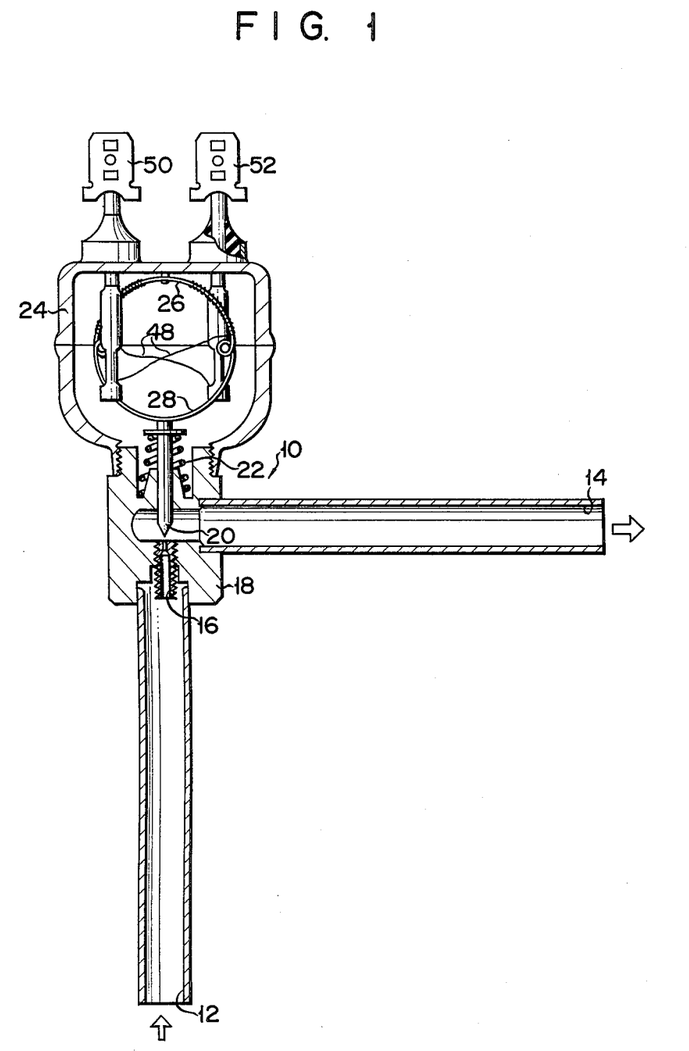
FIG. 1 is a vertical sectional view of a bimetal driven control valve of an embodiment according to the present invention.

In FIG. 1, a bimetal driven control valve 10 of an embodiment according to the present invention is shown. In this embodiment, the control valve 10 is an expansion valve used for a freezer, for example, a family refrigerator or a family air conditioner.

The control valve 10 comprises a refrigerant inflow channel 12, a refrigerant outflow channel 14 and a main body having an orifice 16 which connects the refrigerant inflow channel 12 and the refrigerant outflow channel 14. A rod-shaped valve member 20 is disposed in a main body 18 as shown in FIG. 1. The valve member 20 is movable between a first position at which the orifice 16 is closed and a second position at which the orifice 16 is open. One end of the valve member 20, that is, the end which fits into with the orifice 16, is of substantially conical shape, as shown in FIG. 1. Therefore, when the space between the orifice 16 and the part of the valve member 20 at the second position which fits therewith is made large, the flow rate of the refrigerant which passes through the orifice 16 is increased in a substantially proportional manner. When the space between the orifice and the portion of the valve member 20 which fits therewith is small, the flow rate of the refrigerant which passes through the orifice 16 is decreased in a substantially proportional manner.

As shown in FIG. 1, the main body 18 further comprises an urging means 22 which urges the valve member 20 to the second position.

The other end of the valve member 20 extends from the main body to the external atmosphere. The main body 18 comprises a housing 24 which houses the other end of the valve member 20.

As shown in FIG. 1, within the housing 24 are enclosed a pair of bimetals 26 and 28 of the same dimensions, shape and materials. The bimetal 26 has the shape of an arc which extends upward. In this embodiment, a metal strip of high thermal expansion coefficient is at the outer circumferential surface of the bimetal 26, while a metal strip of low thermal expansion coefficient is at the inner circumferential surface.

The bimetal 28 has the shape of an arc which extends downward. In this embodiment, a metal strip of high thermal expansion coefficient is at the inner circumferential surface of the bimetal 28, while a metal strip of low thermal expansion coefficient is at the outer circumferential surface.

Figure 2:
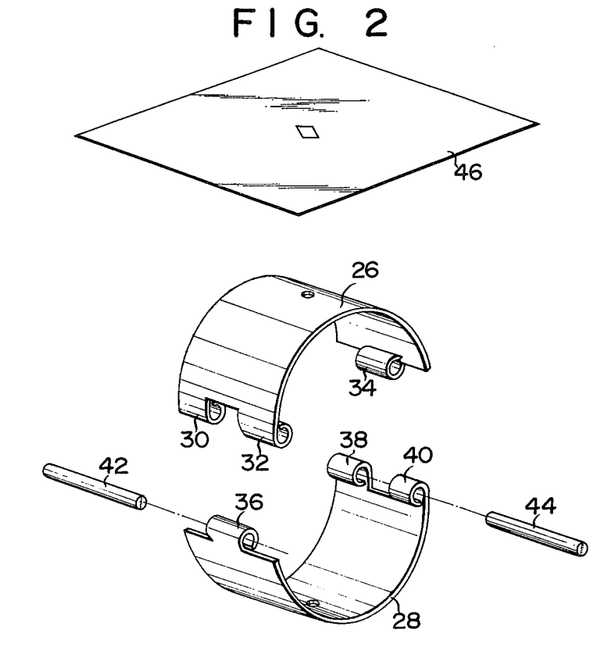
FIG. 2 is an exploded perspective view illustrating a first bimetal and a second bimetal as spaced apart from each other.

A recess which extends in the circumferential direction and which is formed midway along the width is formed at one end of the bimetal 26. The remaining portions of this end are curled to the inside of the arc, as shown in FIG. 2, to form a pair of tubular portions 30 and 32.

In the center at the other end of the bimetal 26 is formed a tongue extending in the circumferential direction. The tongue is curled to the inside of the arc, as shown in FIG. 2, to form a tubular portion 34.

In the center at one end of the bimetal 28 is formed a tongue extending in the circumferential direction. As shown in FIG. 2, the tongue is curled to the inside of the arc to form a tubular portion 36.

At the other end of the bimetal 28 is formed a recess extending in the circumferential direction midway along the width. The remaining portions of the bimetal 28 are curled to the inside of the arc to form tubular portions 38 and 40, as shown in FIG. 2.

A first pin 42 is inserted into the pair of tubular portions 30 and 32 of the bimetal 26 and into the tubular portion 36 of the bimetal 28, as shown in FIG. 2. A second pin 44 is inserted into the tubular portion 34 of the bimetal 26 and into the pair of tubular portions 38 and 40 of the bimetal 28, as shown in FIG. 2. In this embodiment, the first and second pins 42 and 44 are made of a synthetic resin having no thermal conductivity.

Figure 3:
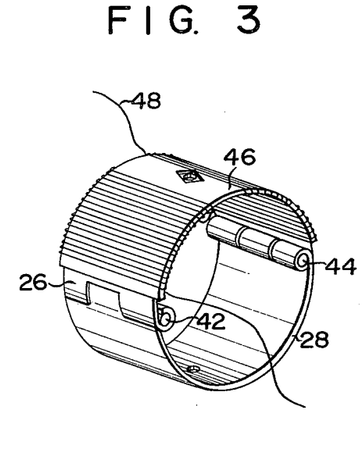
FIG. 3 is a perspective view illustrating the condition in which the first bimetal and the second bimetal are interconnected and a heating means is wound around the first bimetal.

The pair of bimetals 26 and 28 are interconnected by the first and second pins 42 and 44 to form a unit of tubular form, as shown in FIG. 3; that is, a unit of tubular form which expands to the outside. The unit comprising the first bimetal 26 and the second bimetal 28 constituting a tubular form has great resistance to external forces, thus preventing accidental deformations before and during assembly of the control valve. The reforming process of the unit after assembly of the control value can be eliminated.

Further, with this construction, the bimetals do not experience the previously mentioned metal fatigue for a relatively long period of time, so that changes in flow rate resulting from changes in the external temperature at a relatively early period of application of the control valve, or failure of precise flow rate control, do not occur. This indicates that the service life of the control valve is increased. The pair of tubular portions 30 and 32 of the bimetal 26, the tubular portion 36 of the bimetal 28, and the first pin 42 constitute a connecting means in the embodiment of the present invention.

An insulation film 46 is coated on the bimetal 26, as shown in FIG. 2. A heating wire 48 is then wound around the insulation film 46.

The outer portion of the bimetal 26 is mounted to the inner wall of the housing 24 by a known method, as shown in FIG. 1. In this embodiment, the fixing means is a set pin. The outer portion of the bimetal 28 is contiguous with the other end of the valve member 20 disposed at the second position.

By the urging force of the urging means 22, the valve member 20 is usually held in contact with the outer portion of the other bimetal 28. Therefore, the radial displacement of the outer portion of the second bimetal 28 is transferred to the valve member 20 so that the valve member 20 moves in the radial direction of the second bimetal 28, depending on the above displacement of the second bimetal 28. This means that the urging means 22 constitutes a transfer means in the embodiment of the present invention.

The housing 24, as shown in FIG. 1, has a pair of terminal members 50 and 52. The pair of terminal members 50 and 52 are electrically connected to the ends of the heating wire 48.

The pair of terminal members 50 and 52 are electrically connected to a temperature control device (not shown). The temperature control device has a temperature detection means (not shown). The temperature detection means is disposed at the outlet of an evaporator of the refrigerator. When the temperature of the refrigerant gas at the outlet of the evaporator becomes lower than a reference value, the temperature control device increases the current or voltage applied to the heating wire 48, thus increasing the heat generated by the heating wire 48. Further, when the temperature of the refrigerant gas becomes higher than a reference value, the temperature control device decreases the current or voltage applied to the heating wire 48 to reduce the heat generated by the heating wire 48.

When the ambient temperature rises while no current is applied to the heating wire 48, the temperature of the bimetal 26 rises in proportion to the temperature of the bimetal 28, thus equalizing the temperatures of the bimetals 26 and 28. The two ends of the bimetal 26 tend to move so as to become closer together. Simultaneously, the two ends of the bimetal 28 tend to move away from each other. As a result, the stress generated in the bimetal 26 is balanced by the stress generated in the bimetal 28, since the bimetals are connected by the connecting means. Therefore, the distance between the outer portion of the bimetal 26 and the outer portion of the bimetal 28 does not change, and the position of the valve member 20 also does not change.

When electric current is supplied to the heating wire 48, the temperature of the bimetal 26 becomes higher than that of the bimetal 28. As a result, the two ends of the bimetal 26 move closer together. The distance between the outer portion of the bimetal 26 and the outer portion of the bimetal 28 is thus increased. The valve member 20 then moves downward against the urging force of the urging means 22 in accordance with the outward radial displacement of the bimetal 28.

When the temperature of the refrigerant gas at the outlet of the evaporator reaches the reference temperature, the temperature control device maintains the electric current or voltage in order to maintain the temperature at the reference temperature. The two ends of the bimetal 26 then stop moving, and the distance between the end of the valve member 20 of conical shape and the orifice 16 is kept constant. If the ambient temperature changes at this time, the changes of the temperatures of both bimetals 26 and 28 are equal. As a result, the bimetals 26 and 28 are curved to the same extent and in the opposite directions. The stress caused by the bending of the bimetal 26 and the stress caused by the bending of the bimetal 28 cancel out each other at the connecting means. The valve member 20 therefore remains at the same position, regardless of changes of the ambient temperature. That is, the valve member 20 is not displaced by the changes of the ambient temperature, no matter whether or not power is supplied to the heating wire 48.

When the temperature of the refrigerant gas at the outlet of the evaporator increases or decreases with respect to the reference temperature for some reason, the heat generated by the heating wire 48 correspondingly decreases or increases. Thus, the two ends of the bimetal 26 move either closer together or farther apart. The valve member 20 moves upward by the urging force of the urging member 22 or downward against the urging force of the urging member 22 in correspondence with the outward radial movement or the inward radial movement of the bimetal 28. The flow rate of the refrigerant flowing through the control valve 10 is increased or decreased when the distance between the end of the valve member 20 of conical shape and the orifice 16 changes. As a result, the temperature of the refrigerant gas at the outlet of the evaporator returns to the reference temperature.

A bimetal driven control valve according to the present invention is characterized by comprising a main body having a fluid inflow channel, a fluid outflow channel, and an orifice which connects the fluid inflow channel with the fluid outflow channel; a valve member which is mounted in the main body and which is movable between a first position at which the orifice is closed and a second position at which the orifice is open; a first bimetal which constitutes part of a tubular body and whose inner and outer circumferential surfaces are two metals of different thermal expansion coefficients, the substantially outer portion of the first bimetal being fixed to the main body; a second bimetal which constitutes part of the tubular body and whose outer circumferential surface is formed from the same metal used for the inner circumferential surface of the first bimetal, and whose inner circumferential surface is formed by the same metal used for the outer circumferential surface of the first bimetal, the inner circumferential surface of the second bimetal being opposed to the inner circumferential surface of the first bimetal, and said first bimetal and said second bimetal being curved to form said tubular body; means for connecting the respective ends of the first bimetal and the second bimetal; means for transferring the radial movement of the substantially outer portion of the second bimetal to the valve member, and for moving the valve member in correspondence with the radial movement of the outer portion of the second bimetal; and means for heating the first bimetal.

With this construction, the deformation stress generated at the first bimetal due to changes in the ambient temperature is canceled by the deformation stress generated at the second bimetal due to the changes in the ambient temperature. Changes in the position of the valve member due to bimetal deformation during changes in the ambient temperature are prevented, thus allowing precise control of the flow rate. Further, the respective ends of the first and second bimetals need not be fixed to the main body, so the manufacturing process is thus simplified and the manufacturing cost can be reduced. Since the unit constituted by the first bimetal and the second bimetal has a large resistance to external forces, deformation before and during assembly may be prevented. Thus, deformation of the unit after mounting the control valve can be eliminated. This also contributes to simplification of the manufacturing process and reduction of the manufacturing cost. Further, metal fatigue does not occur for a relatively long period of time, so changes in the flow rate at an early period of application due to changes in the external temperature, that is, failure of precise flow rate control, do not occur. Therefore, a long service life of the control valve can be achieved.

A bimetal driven control valve according to the present invention has connecting means preferably comprising tubular portions which are formed by curling the respective ends of the first bimetal, tubular portions which are formed by curling the respective ends of the second bimetal, a first pin which is inserted into the tubular portions formed at one end of the first bimetal and the tubular portion formed at one end of the second bimetal, and a second pin which is inserted into the tubular portion formed at the other end of the first bimetal and the tubular portions formed at the other end of the second bimetal.

With this construction, deformation of the first bimetal due to the total heat generated by the heating means may become relatively large, and the hysteresis of the deformation of the first bimetal is decreased. Further, the construction and assembly of the connecting means may be simplified.

The bimetal driven control valve of the above embodiment according to the present invention preferably comprises the first and second pins made of a material having no thermal conductivity.

With this construction, conduction to the second bimetal of the heat which heats the first bimetal by the heating means is reduced. Therefore, the heat necessary for the desired deformation of the first bimetal is reduced, correspondingly reducing the operating cost of the control valve.

In the bimetal driven control valve according to the present invention, the first and second bimetals are preferably of semicircular cross-sectional shape.

With this construction, the first and second bimetals which are interconnected constitute a unit of tubular shape, increasing the resistance of the first and second bimetals against external forces exerted through the valve member. Therefore, the first and second bimetals are made compact and their service life is extended.

The embodiment described above is only for illustrating the present invention, and does not limit the present invention. Modifications and improvements thereof may be included within the scope and spirit of the present invention.

Figure 4:
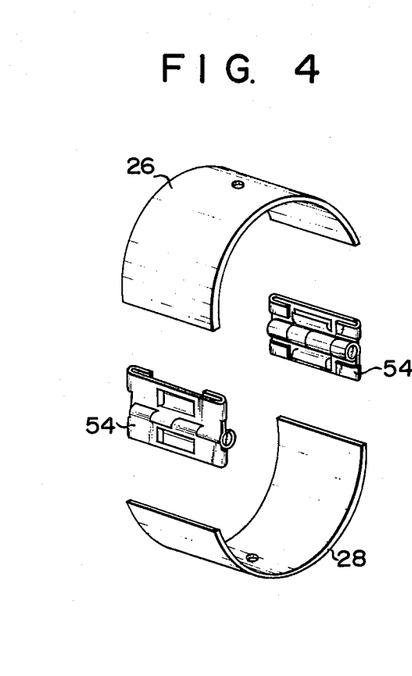
FIG. 4 is an exploded perspective view of a first modification according to the present invention.
Figure 5:
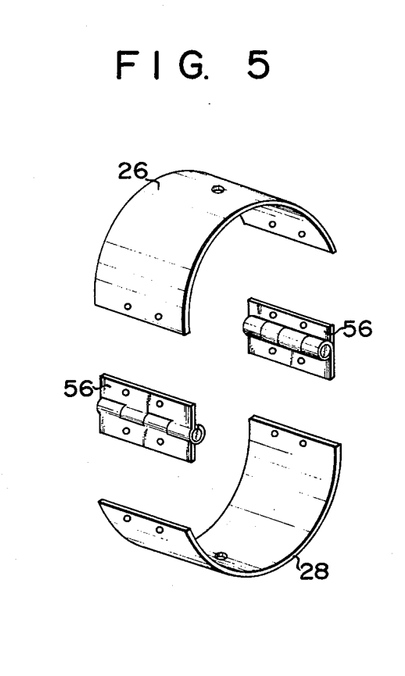
FIG. 5 is an exploded perspective view of a second modification according to the present invention.

For example, a pair of hinges 54 or 56 may be used, as shown in FIGS. 4 and 5, in place of the connecting means which connects the respective ends of the first bimetal 26 and the second bimetal 28. The pair of hinges 54 as shown in FIG. 4 are connected to the bimetals by welding. The pair of hinges 56 as shown in FIG. 5 are connected with rivets or with nuts and bolts.

The respective ends of the first bimetal 26 may be connected to those of the second bimetal 28 by a connecting means such as metal solder or the like.

Figure 6:
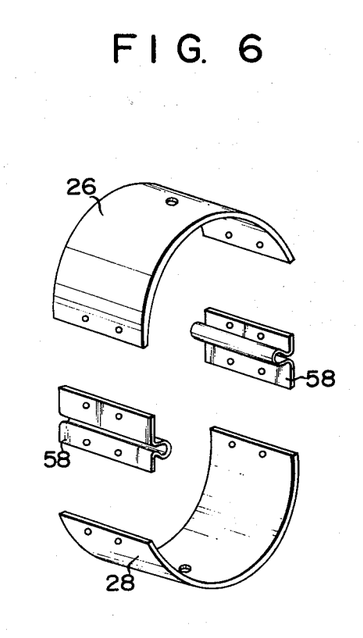
FIG. 6 is an exploded perspective view of a third modification according to the present invention.

For example, the connecting means may be formed by a pair of flexible metal pieces 58 as shown in FIG. 6, for connecting the respective ends of the first bimetal 26 and with those of the second bimetal 28.

Figure 7:
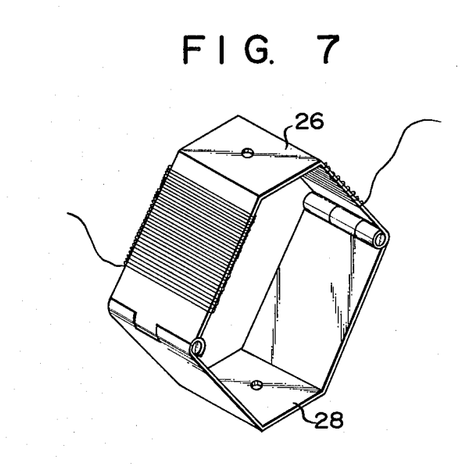
FIG. 7 is an exploded perspective view of a fourth modification according to the present invention.

Further, the first bimetal 26 may be formed in a substantially inverted V-shape and the second bimetal 28 may be formed substantially in a V-shape, as shown in FIG. 7.

Figure 8:
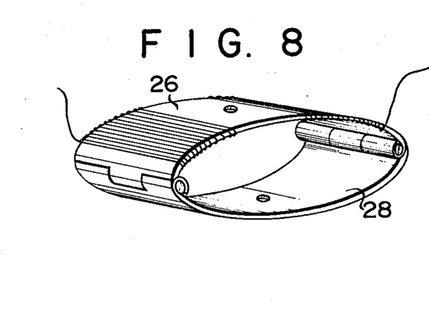
FIG. 8 is an exploded perspective view of a fifth modification according to the present invention.

As shown in FIG. 8, the first bimetal 26 may be formed in a semielliptical shape flexed upward, and the second bimetal 28 may be formed as semielliptical shape flexed downward.

The other end of the valve member 20 may be directly fixed to the outer portion of the second bimetal 28. In this case, the means for fixing the other end of the valve member 20 to the outer portion of the second bimetal constitutes the transferring means of the present invention Alternatively, a metal of low thermal expansion coefficient may be disposed at the outer circumferential side, and a metal of high thermal expansion coefficient is disposed at the inner circumferential side of the first bimetal. At the same time, the metal of high thermal expansion coefficient is disposed at the outer circumferential side of the second bimetal, while the metal of low thermal expansion coefficient is disposed at the inner circumferential side thereof.

With this construction, when the first bimetal is heated by the heating means, the two ends of the first bimetal move away from each other. Therefore, the distance between the outer portion of the first bimetal and the outer portion of the second bimetal is reduced. At the time of assembly, the outer portion of the second bimetal must be connected to the other end of the valve member by way of the transferring means at the first position.

The bimetal driven control valve may be used in place of a solenoid valve currently used in freezers.

The bimetal driven control valve may be used in place of an evaporator pressure regulator which maintains a constant evaporator pressure of the refrigerant in the evaporator of the freezer.

Further, the bimetal driven control valve may be used in place of a condenser pressure regulator which maintains a constant pressure in the condenser.

What is claimed is:

1. A bimetal driven control valve comprising:
    a main body having a fluid inflow channel, a fluid outflow channel, and an orifice which connects said fluid inflow channel and said fluid outflow channel;
    a valve member which is mounted in said main body and which is movable between a first position at which said orifice is closed and a second position at which said orifice is released to be open;
    a first bimetal which constitutes part of a tubular body, whose inner and outer circumferential surfaces have two metals of different thermal expansion coefficients, a substantially outer portion of said bemetal being fixed to said main body;
    a second bimetal which constitutes part of said tubular body and whose outer circumferential surface is formed by the same metal used for the inner circumferential surface of said first bimetal, and whose inner circumferential surface is formed by the same metal used for the outer circumferential surface of said first bimetal, the inner circumferential surface of said second bimetal being opposed to the inner circumferential surface of said first bimetal, said first bimetal and said second bimetal being curved outwardly to form said tubular body;
    means for connecting respective ends of said first bimetal and said second bimetal;
    means for transferring radial movement of a substantially outer portion of said second bimetal to said valve member, and for moving said valve member in correspondence with said radial movement of said outer portion of said second bimetal; and
    means for heating said first bimetal;
    said connnecting means comprising tubular portions which are formed by curling the respective ends of said first bimetal, tubular portions which are formed by curling the respective ends of said second bimetal, a first pin which is inserted into said tubular portions formed at one end of said first bimetal and into said tubular portion formed at one end of said second bimetal, and a second pin which is inserted into said tubular portion formed at the other end of said first bimetal and into said tubular portions formed at the other end of said second bimetal.

2. A bimetal driven control valve according to claim 1, wherein said first pin and said second pin are made of thermally nonconductive material.

* * * * *